United States Patent
Yuan et al.

(10) Patent No.: US 9,442,946 B1
(45) Date of Patent: Sep. 13, 2016

(54) METHODS AND SYSTEMS OF PROCESSING CONTEXTUAL INFORMATION

(71) Applicant: The Boeing Company, Chicago, IL (US)

(72) Inventors: Jun Yuan, Bellevue, WA (US); Ali Bahrami, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 13/778,421

(22) Filed: Feb. 27, 2013

(51) Int. Cl.
*G06F 7/00* (2006.01)
*G06F 17/30* (2006.01)

(52) U.S. Cl.
CPC ............................. *G06F 17/3012* (2013.01)

(58) Field of Classification Search
CPC ................... G06F 17/30943; G06F 17/3012
USPC ........ 707/602, 736, 758, 921; 706/61, 47, 48
See application file for complete search history.

(56) References Cited

U.S. PATENT DOCUMENTS

| | | | |
|---|---|---|---|
| 7,693,900 B2 | 4/2010 | Wilmering et al. | |
| 7,853,618 B2 | 12/2010 | Yuan et al. | |
| 7,865,308 B2* | 1/2011 | Athsani et al. | 701/457 |
| 7,970,786 B2 | 6/2011 | Bahrami et al. | |
| 8,010,478 B2* | 8/2011 | Lim et al. | 706/47 |
| 2009/0008450 A1* | 1/2009 | Ebert et al. | 235/439 |
| 2009/0102859 A1* | 4/2009 | Athsani et al. | 345/619 |
| 2009/0234958 A1* | 9/2009 | Lee | 709/230 |
| 2010/0262451 A1 | 10/2010 | Bahrami et al. | |
| 2011/0184604 A1* | 7/2011 | Franke | G05D 1/0088 701/23 |
| 2011/0283285 A1* | 11/2011 | Saad | G06Q 10/0631 718/102 |
| 2012/0029958 A1* | 2/2012 | Ayed et al. | 705/7.11 |
| 2013/0335221 A1* | 12/2013 | Prieto | 340/540 |

OTHER PUBLICATIONS

Ali Bahrami, Jun Yuan, David Mott, Paul Smart and David Braines; Enhanced Situation Awareness in Collaborative Planning With Context-Aware Mashups and Light-Weight Applications; Proceedings of the Fourth Annual Conference of the International Technology Alliance, London UK; Sep. 2010, 7 pp.

Ali Bahrami, Jun Yuan, David Mott, Chukwuemeka David Emele, Daniele Masato and Timothy J. Norman; Collaborative and Context-Aware Planning; Military Communications Conference; Nov. 2008; MILCOM 2008, 7 pp.

(Continued)

*Primary Examiner* — Marc Somers
(74) *Attorney, Agent, or Firm* — Toler Law Group, PC

(57) ABSTRACT

A method includes retrieving, at a context sensor associated with an information object, first contextual information from a source external to the context sensor. The first contextual information includes domain-independent information associated with the information object. The method also includes generating second contextual information based on application of at least one derivation rule to the first contextual information. Alternately, or in addition, the second contextual information may be generated based on application of the at least one derivation rule to a combination of the first contextual information and other contextual information associated with another context sensor. The second contextual information includes domain-specific information associated with the information object. The method further includes adding the second contextual information to the information object.

20 Claims, 5 Drawing Sheets

(56) References Cited

OTHER PUBLICATIONS

John A. Allen, Dr. David Mott, Dr. Ali Bahrami, Dr. Jun Yuan, Dr. Cheryl Giammanco, Dr. Jitu Patel; A Framework for Supporting Human Military Planning; ACITA 2008, 1569125901; Sep. 2008, 8 pp.

Ali Bahrami, Jun Yuan, David Braines, David Mott and Paul Smart; Enhanced Situation Awareness in Collaborative Planning Through Context-Aware Mashups; ACITA 2009; Jul. 2009, 7 pp.

Jun Yuan, Ali Bahrami, Changzhou Wang, Marie Murray, Anne Hunt; A Semantic Information Integration Tool Suite; Proceedings of the 32nd International Conference on Very Large Databases (VLDB), Seoul, Korea; Sep. 2006, 4 pp.

\* cited by examiner

METHODS AND SYSTEMS OF PROCESSING CONTEXTUAL INFORMATION

BACKGROUND

Modern computing scenarios often include multiple heterogeneous users, roles, tasks, databases, files, and preferences. For example, each user may need a different set or subset of the available information to successfully implement his or her part in a large-scale multi-user task or strategy. In such distributed, heterogeneous systems, a user may find it difficult to perform tasks in the absence of contextual information.

To illustrate, consider an information file or object entitled "Jazz." Without additional information, a user may not be able to quickly determine whether the file is about a musical genre or a professional basketball team. Information associated with a particular piece of data or a particular file can be classified as meta-information (also known as metadata) or contextual information. Metadata is often referred to as "data about the data." For example, traditional metadata for the "Jazz" file may identify a file size, the structure of the file, and a date of creation. However, access to such traditional metadata may not enable the user to determine the nature of the "Jazz" file. In contrast, contextual information about the file (e.g., the creator of the file is a music fan and has never visited Utah) may enable a proper interpretation or understanding of the file. However, as computing systems become larger and networking technologies enable access to more information sources, retrieving and managing such contextual information may become difficult.

SUMMARY

Methods and systems of processing contextual information are disclosed. A contextual information processing framework may classify contextual information in two ways: physically and logically. For example, contextual information may be classified into a "primary" physical partition or a "secondary" physical partition. "Primary" contextual information may include domain-independent (e.g., "basic" or "fundamental") data that can be obtained from an external information source and stored within the contextual information processing framework. "Secondary" contextual information may include domain-specific (e.g., "complex") data that is derived (e.g., on-demand at runtime) from primary contextual information. Contextual information may also be classified logically into different logical context categories. For example, logical context categories for a military planning system may include "weather," "road conditions," "geographic information," "fuel requirements," "troop movement schedules," etc.

The described contextual information processing framework may include a context engine and one or more context sensors. The context engine may provide an organizational interface between the context sensors and one or more external information systems or information sources. Each context sensor may be associated with a particular logical category. The context sensor may store primary contextual information for the logical category and may include derivation rules that describe how to derive secondary contextual information from the primary contextual information. The context sensor may direct the context engine regarding when and how to retrieve contextual information from an external source. Context sensors may also direct the context engine to retrieve updated primary contextual information and to use the updated primary contextual information to derive updated secondary contextual information.

Context sensors may provide contextual information to one or more information objects. For example, in a military planning system, information objects may include different logistical and combat plans. By providing contextual information to the information objects, consumers of the information objects may be able to better understand and interpret the information objects. For example, in the military planning system, the contextual information may provide a shared understanding of operational objectives and evolving conditions (e.g., real-time weather updates), and how such factors influence the logistical and combat plans.

In a particular embodiment, a system includes a processor and a memory coupled to the processor. The memory stores instructions executable by the processor to retrieve, at a context sensor associated with an information object, first contextual information from a source external to the context sensor. The first contextual information includes domain-independent information associated with the information object. The instructions are also executable by the processor to generate second contextual information based on application of at least one derivation rule to the first contextual information. The second contextual information includes domain-specific information associated with the information object. The instructions are further executable by the processor to add the second contextual information to the information object. For example, adding the second contextual information to the information object may include dynamically linking and/or attaching the second contextual information to the information object in real-time.

In another particular embodiment, a method includes retrieving, at a computing device including a processor, first contextual information from a source external to the computing device. The first contextual information includes domain-independent information associated with an information object. The method also includes generating second contextual information based on application of at least one derivation rule to the first contextual information. The second contextual information includes domain-specific information associated with the information object. The method further includes adding the second contextual information to the information object. For example, adding the second contextual information to the information object may include dynamically linking and/or attaching the second contextual information to the information object in real-time.

In another particular embodiment, a non-transitory processor-readable medium includes instructions that, when executed by a processor, cause the processor to retrieve, at a context sensor associated with an information object, first contextual information from a source external to the context sensor. The first contextual information includes domain-independent information associated with the information object. The instructions, when executed by the processor, also cause the processor to generate second contextual information based on application of at least one derivation rule to the first contextual information. The second contextual information includes domain-specific information associated with the information object. The instructions, when executed by the processor, further cause the processor to add the second contextual information to the information object. For example, adding the second contextual information to the information object may include dynamically linking and/or attaching the second contextual information to the information object in real-time.

The features, functions, and advantages that have been described can be achieved independently in various embodiments or may be combined in yet other embodiments, further details of which are disclosed with reference to the following description and drawings. Other aspects, advantages, and features of the present disclosure will become apparent after review of the entire application, including the following sections: Brief Description of the Drawings, Detailed Description, and the Claims.

DETAILED DESCRIPTION

Figure 1:
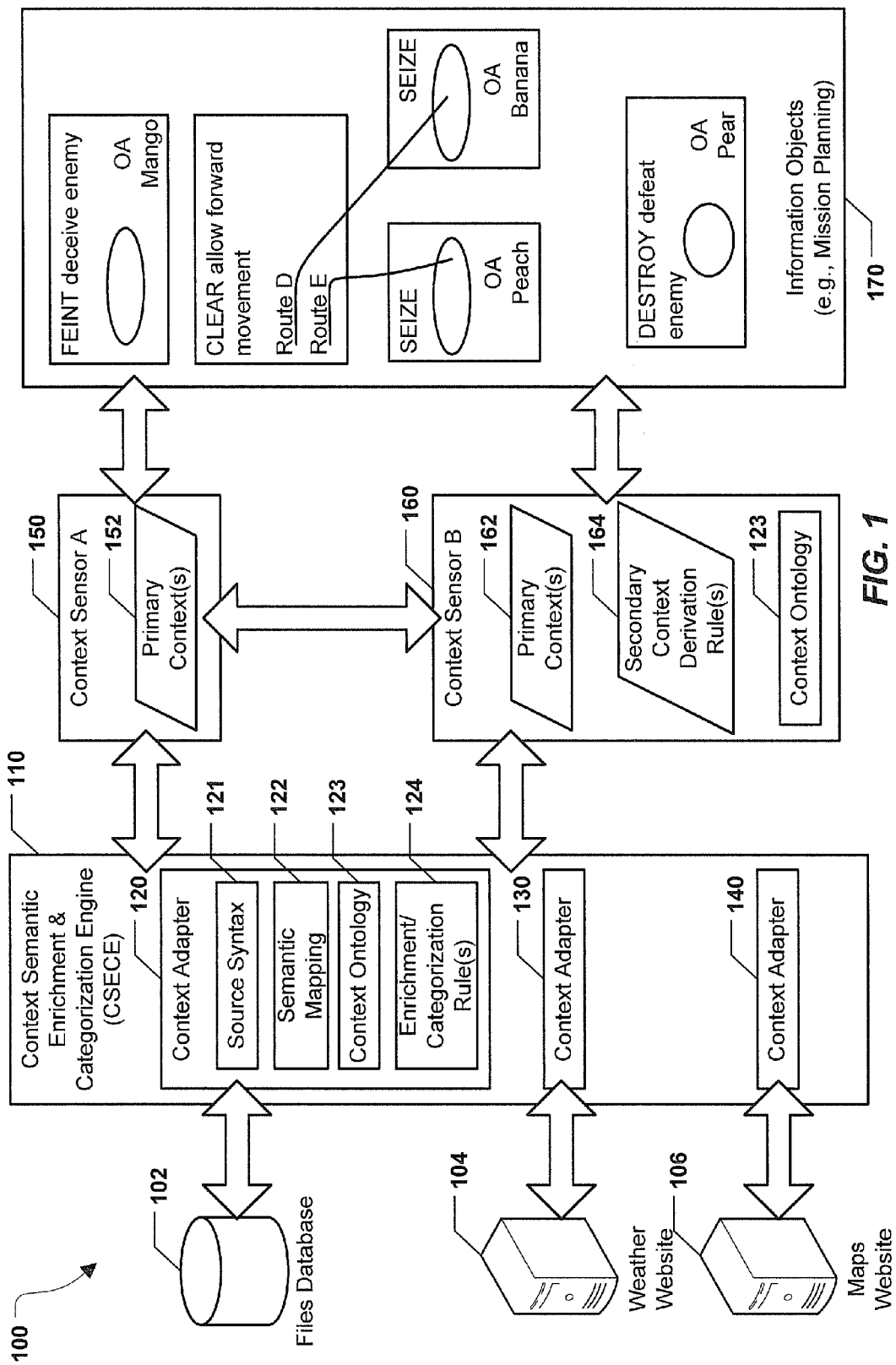
FIG. 1 is a diagram to illustrate a particular embodiment of a system that is operable to process contextual information.

FIG. 1 illustrates a particular example of a system 100 that is operable to process contextual information associated with military planning information objects. It should be noted, however, that various examples of systems and use cases described herein are for illustration only. The described contextual processing framework and techniques may be used in other systems and use-cases besides military planning.

The system 100 includes a context semantic enrichment and categorization engine (CSECE, alternately referred to herein as "context engine") 110 and one or more context sensors (e.g., an illustrative first context sensor 150 and second context sensor 160). Each of the context sensors may be connected to (e.g., communicably coupled to) one or more information objects 170. For example, FIG. 1 illustrates five exemplary military planning information objects.

In a particular embodiment, the context engine 110 may be a software entity that leverages semantic web principles (e.g., an ontology) to communicate with external information systems and organize contextual information, as further described herein. In a particular embodiment, each of the context sensors 150, 160 may be a software agent that is represented using processor-executable instructions and processor-readable data. For example, in an object-oriented implementation, each of the context sensors 150, 160 may be objects of the type "context sensor" and/or derived from a "context sensor" base class. Context sensors may store various types of data. For example, context sensors may store contextual information, instructions regarding when and how to retrieve contextual information, when and how to update contextual information, rules regarding how to derive secondary contextual information, a context ontology, etc.

It should be noted that contextual information may be different from metadata. Information associated with a particular piece of data or a particular file may be classified as meta-information (also known as metadata) or contextual information. Metadata is often referred to as "data about the data." For example, consider an information object "Java." To a geography student, the information object may represent an island of Indonesia. To a coffee lover, the information object may represent a type of coffee. To a software engineer, the information object may represent a programming language. Metadata for the information object may identify file properties such as a file size, structures, and a date of creation, which may be necessary for software or a computer system to process, for example, opening of the file and displaying the file on a screen. However, access to the metadata may not enable the user to properly interpret or understand the information object. Contextual information about the information object may enable a proper interpretation or understanding of the file. For example, a context sensor associated with the information object may determine and add the contextual information "island" to the information object, so that a consumer of the "Java" information object understands that in this case, "Java" is referring to the Indonesian island.

Figure 2:
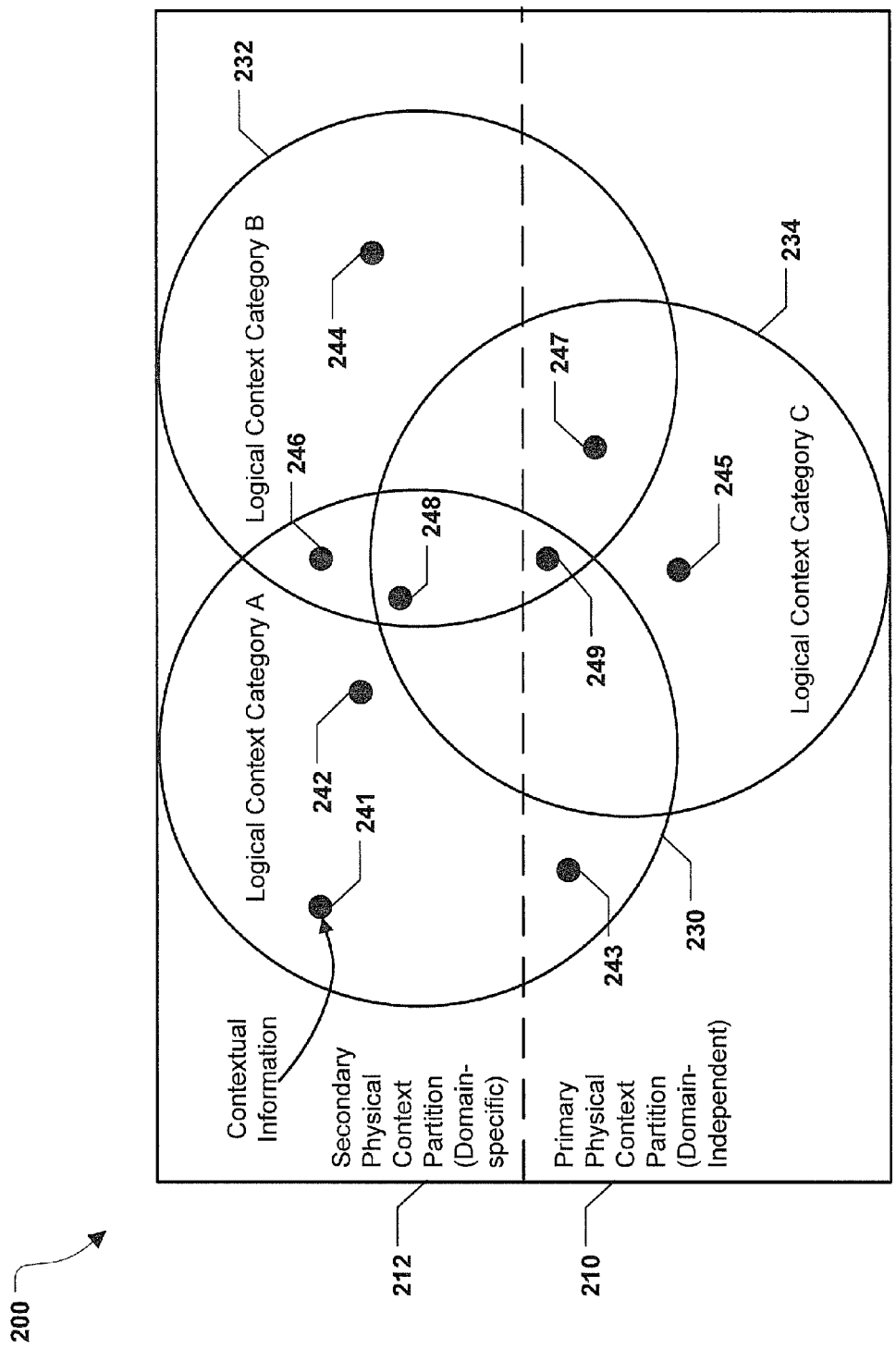
FIG. 2 is a diagram to illustrate a particular embodiment of classifying contextual information.

The system 100 of FIG. 1 may support classification of contextual information according to two different dimensions: physical and logical. A particular example of classifying contextual information according to physical and logical dimensions is illustrated in FIG. 2 and is generally designated 200. In particular, FIG. 2 illustrates two physical context partitions 210 and 212, and three logical context categories 230, 232, and 234. It should be noted that alternate classification/management systems for contextual information may include a different number of logical context categories.

With respect to physical classification, contextual information may be classified as "primary" or "secondary." Physical classification may be a function of computing resource constraints in a system. For example, primary contextual information, such as the contextual information 243, 245, 247, and 249 in FIG. 2, may include contextual information that is considered fundamental or basic (e.g., who, what, where, when, how, etc.). Primary contextual information may be retrieved from an external information source or system and stored at a context sensor. "Secondary" contextual information, such as the contextual information 241, 242, 244, 246, and 248 in FIG. 2, may represent contextual information that is complex. Secondary contextual information may be derived at run-time (e.g., from primary contextual information and/or other types of secondary contextual information) without being stored like the primary contextual information. Thus, the determination of whether to classify something as secondary contextual information may involve determining whether run-time resources are available to compute the secondary contextual information (e.g., in real-time). Depending on system resources, secondary contextual information may optionally be cached at a context sensor.

Primary contextual information may be domain-independent, whereas secondary contextual information may be domain specific. For example, consider an information object that contains the answer to the question "what is Bob doing at 8 am?" Primary contextual information for the information object may include a specific location of Bob at 8 am. Secondary contextual information for the information object may be more complex, and may be derived based on the primary contextual information and other factors. For example, secondary contextual information may indicate, based on multiple locations of Bob around 8 am (i.e., the primary contextual information) and a map of Bob's home that Bob is moving back and forth between a sink and an oven. Based on the primary and secondary contextual information, the information object may indicate that Bob is cooking breakfast.

As another example, primary contextual information retrieved from a traffic information source and a mapping information source may indicate traffic flow on thoroughfares in a city. Secondary contextual information derived from the primary contextual information may indicate how many hours or minutes a person will be delayed by various routes between two places in the city. The primary and secondary contextual information may be used to generate a preferred (e.g., least delayed) route (e.g., an information object) for the person to follow.

It should be noted that similar types of contextual information may be classified as primary or secondary. For example, when contextual information regarding "time" represents a particular time zone, the contextual information may be primary. However, when contextual information regarding "time" identifies whether daylight savings is in effect, the contextual information may be secondary (e.g., because the contextual information is derived from the primary time zone information and primary calendar information that identifies a current date).

As illustrated in FIG. 2, contextual information may also be classified into one or more logical context categories 230, 232, and 234. Each logical context category may be associated with one or more context sensors, as further described herein. The number and nature of the logical context categories in a particular system may depend on the type of data being processed.

Returning to FIG. 1, context sensors may include two types of information: state and behavior. States may be represented as a set of attributes representing primary contextual information. For example, the first context sensor 150 stores primary contextual information 152. Such primary contextual information 152 may be retrieved and/or refreshed by the context engine 110 at the direction of the first context sensor 150.

Behaviors may detail methods of deriving secondary contextual information from primary contextual information. For example, the second context sensor 160 stores primary contextual information 162 (i.e., states) and one or more derivation rules 164 (i.e., behaviors). The primary contextual information 162 may be retrieved and/or refreshed by the context engine 110 at the direction of the second context sensor 160. The derivation rule(s) 164 may instruct the context engine 110 regarding how to derive secondary contextual information. For example, the context engine 110 may, in accordance with the derivation rule(s) 164, generate a particular piece of secondary contextual information based on the primary contextual information 152 retrieved from the first context sensor 150 and/or the primary contextual information 162 stored at the second contextual sensor 160. Thus, multiple context sensors may be combined to form a new context sensor. For example, the second context sensor 160 may be considered combined with the first context sensor 150 when the second context sensor 160 derives secondary contextual information based on the primary contextual information 152 from the first context sensor 150.

When underlying primary contextual information is updated, the context engine 110 may also derive updated secondary contextual information based on the updated primary contextual information. For example, contextual information may be updated in response to a request (e.g., from an information object or context sensor) to update the contextual information, in response to a notification (e.g., from an external information source) that updated contextual information is available, or any combination thereof.

In FIG. 1, the second context sensor 160 also stores a context ontology 123. The context ontology 123 may represent an information model of the logical context categories in the system 100. For example, the context ontology 123 may represent a formalistic definition that indicates classifications associated with each logical context category and/or relationships between logical context categories. To illustrate, one of the derivation rule(s) 164 may indicate that "if the weather is stormy, do X." The context ontology 123 may define what combination of primary and secondary contextual information is classified as "stormy" weather. As another example, primary contextual information may indicate that a temperature reading from an external system is twenty. The context ontology may define that temperature readings are in degrees Kelvin. Alternately, or in addition to being stored in one or more context sensors, the context ontology 123 may be stored in the context engine 110, as further described herein.

The context engine 110 may connect the context sensors 150, 160 to external information sources and may also connect the context sensors 150, 160 to each other. The context engine 110 may include a context adapter for each of the external information sources available. For example, in the embodiment of FIG. 1, the context engine 110 includes a first context adapter 120 for a database 102, a second context adapter 130 for a weather website, and a third context adapter 140 for a maps website. The first context adapter 120 may include a definition of a source syntax 121 used by the database 102, a semantic mapping 122 between the source syntax and the context ontology 123, the context ontology 123, and/or one or more enrichment and categorization rules 124 that are executable to convert "original" data received from the database 102 into a format represented by the context ontology 123. The second context adapter 130 and the third context adapter 140 may also include such components, although such components are not shown in FIG. 1 for ease of illustration.

In an alternate embodiment, a context adapter for an information source may exist at the information source instead of at the context engine 110. For example, a context adapter may be developed by an owner of the information source. The context adapter may be made available to the system 100 as a "plug-in" or output from the context adapter may be available via an application programming interface (API).

During operation, the military planning information objects 170 may include or otherwise access contextual information provided by the context sensors 150, 160 (e.g., via shared memory, via an API, or via some other hardware or software mechanism). As a result, each of the information objects 170 may include or have access to contextual information. When the information objects are shared among users, the contextual information and context sensors are shared as well. Each of the context sensors 150, 160 may represent a different logical category associated with military planning, may store primary contextual information for the logical category, may store derivation rules regarding how to generate secondary contextual information for the logical category, or any combination thereof. To illustrate, contextual information for military mission planning may include actions, assumptions (e.g., contingencies that affect the validity of a plan), and constraints (e.g., resource limits that must be followed by the plan).

For example, one of the information objects 170 (e.g., a logistical or combat plan) may order a military commander to move to a particular location. By accessing the contextual information from the context sensors 150, 160 associated with the logistical or combat plan, the military commander may be able to understand real-time conditions (e.g., weather, geography, etc.) causing or influencing the troop movement order, and the military commander may thus be more aware of the overall tactical situation.

To provide such contextual information to the information objects 170, each of the context sensors 150, 160 may instruct the context engine 110 to retrieve data from the database 102, the weather website 104, and/or the maps website 106 via the corresponding context adapter 120, 130, and/or 140. The context adapters 120, 130, and/or 140 may translate between information formats used by the external information sources and an information format of the system 100. The context sensors 150, 160 may store primary contextual information and may derive secondary contextual information. The context sensors 150, 160 may also add (e.g., provide access and necessary transformation to) the contextual information to the information objects 170. For example, adding contextual information to an information object may include dynamically linking and/or attaching the contextual information to the information object in real-time.

When a context change is detected, the context engine 110 may update the primary contextual information 152, 162 in the context sensors 150, 160 and may derive updated secondary contextual information from the updated primary contextual information. Alternately, updated contextual information may be retrieved periodically by the context engine 110. The context sensors 150, 160 may add the updated primary and secondary contextual information to the information objects 170, so that consumers of the information objects 170 (e.g., military personnel) may have access to the most recent contextual information.

The system 100 of FIG. 1 may thus enable retrieval, management, and updating of contextual information from multiple external information sources/systems and may enable providing such contextual information to multiple information objects in a heterogeneous, distributed system. For example, sharing relevant contextual information for different military mission planning activities may increase shared understanding between different mission planning entities, may reduce information overload, and may result in a more flexible mission plan and successful mission execution.

It will be appreciated that successful mission planning in a collaborative distributed environment may require multiple planners to work together in semi-independent fashion, generating a set of interrelated activities that are carried out by different planners, at different times, in different locations, and with different perspectives. A complex mission plan may included many plan components (or sub-plans) created by different planners and organized in a complex hierarchical structure. Integrating such plan components together may involve a lot of information sharing and exchange, not only among different human planners, but also among multiple decision making agents, different planning tools, and heterogeneous external information systems in various locations. Each plan component (e.g., one of the information objects 170) may contain a set of activities that are conceptually different (e.g., identifying the best location for a fuel dump, moving troops, deploying sensors, fire planning, determining courses of action, etc.). Each information object 170 may be associated with different types of contextual information in order to achieve mission success in varying conditions. For example, a logistic plan may use a battlefield intelligence report to select a safe location for a fuel dump. Contextual information based on the weather website 104 and the maps website 106 (e.g., a weather forecast, road conditions, and geographic information) may be important factors in determining the appropriate fuel dump location.

In addition, it will be appreciated that many of the described information objects 170 may be mutually interrelated. Thus, synergy and consistency of the information objects 170 may be important for mission success. To illustrate, consider a combat plan. Based on assumed combat activities, fuel and ammunition requirements may be estimated as inputs for a logistics planning team. The logistics team may in turn plan how best to store and deliver the fuel and ammunition to troops wherever the troops are likely to be on the battlefield during various phases of the combat plan. Thus, the combat and logistical information objects are interrelated and should be generated in close collaboration for synergy and consistency.

Moreover, it will be noted that a "perfect" plan may not guarantee mission success, because tactical situations (e.g., rationales, constraints, and assumptions) may evolve, resulting in changes to combat and logistical plans. Changes made to one of the plans may need to be validated with other plans. For example, if a combat plan (e.g., a first information object) is changed in response to real-time updates to contextual information, a logistical plan (e.g., a second information object) may also be changed to make sure that new fuel and ammunition requirements will be met. If the logistical plan cannot be changed (e.g., due to contextual information indicating a transportation resource limit, an unsafe fuel dump area, etc.), the combat plan may be modified again to maintain consistency between the combat plan and the logistical plan. The system 100 of FIG. 1 may enable close collaboration, synergy, and consistency between information objects via sharing of relevant contextual information from different sources between the information objects.

Figure 3:
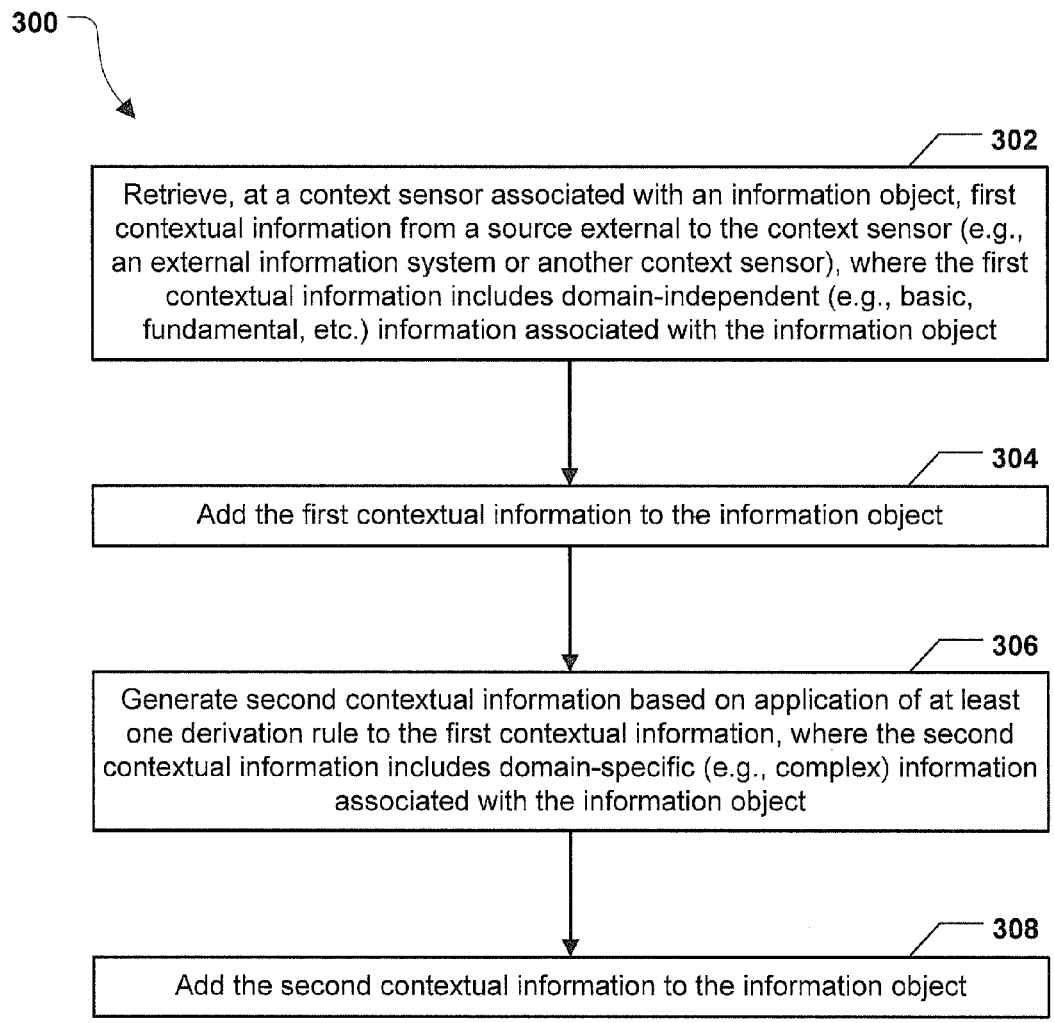
FIG. 3 is a flowchart to illustrate a particular embodiment of a method of processing contextual information.

Referring to FIG. 3, a flowchart of a particular embodiment of a method 300 of processing contextual information is illustrated. In an illustrative embodiment, the method 300 may be performed at the system 100 of FIG. 1.

The method 300 may include retrieving, at a context sensor associated with an information object, first contextual information from a source external to the context sensor, at 302. The first contextual information may include domain-independent information associated with the information object. The first contextual information may be retrieved in response to expiration of a time period (e.g., when the context sensor indicates that contextual information is to be periodically retrieved from the information source), in response to a request (e.g., a request from the context sensor or information object), in response to a notification (e.g., a notification from the information source that updated contextual information is available), in response to an event (e.g., a data change in an information object or a context sensor of a system, such as the system 100 of FIG. 1), or any combination thereof. In a particular embodiment, the source includes an external information system. For example, in FIG. 1, the primary contextual information 152 may be retrieved from one of the external sources 102, 104, or 106 and may be stored at the first context sensor 150. Alternately, contextual information may be retrieved from another context sensor. For example, in FIG. 1, the primary contextual information 152 may be retrieved on-demand from the first context sensor 150 and may be provided to the second context sensor 160 for subsequent processing.

The method 300 may also include adding the first contextual information to the information object, at 304. Contextual information may be "added" to an information object by storing the contextual information as data within the information object, providing the information object access to the contextual information stored at the context sensor (e.g., via a shared memory, an API, etc.), or any combination thereof. For example, in FIG. 1, the primary contextual information 152 may be added to one or more of the information objects 170.

The method 300 may further include generating second contextual information based on application of at least one derivation rule to the first contextual information, at 306. The second contextual information may include domain-specific information associated with the information object. For example, referring to FIG. 1, secondary contextual information may be derived by applying the derivation rule(s) 164 to the primary contextual information 152 and/or the primary contextual information 162. Deriving the secondary contextual information may also include referencing the context ontology 123 to access a formalistic definition of the relationship between various pieces of primary and secondary contextual information in the system 100.

The method 300 may include adding the second contextual information to the information object, at 308. For example, in FIG. 1, the secondary contextual information derived based on the derivation rule(s) 164 may be added to one or more of the information objects 170.

Figure 4:
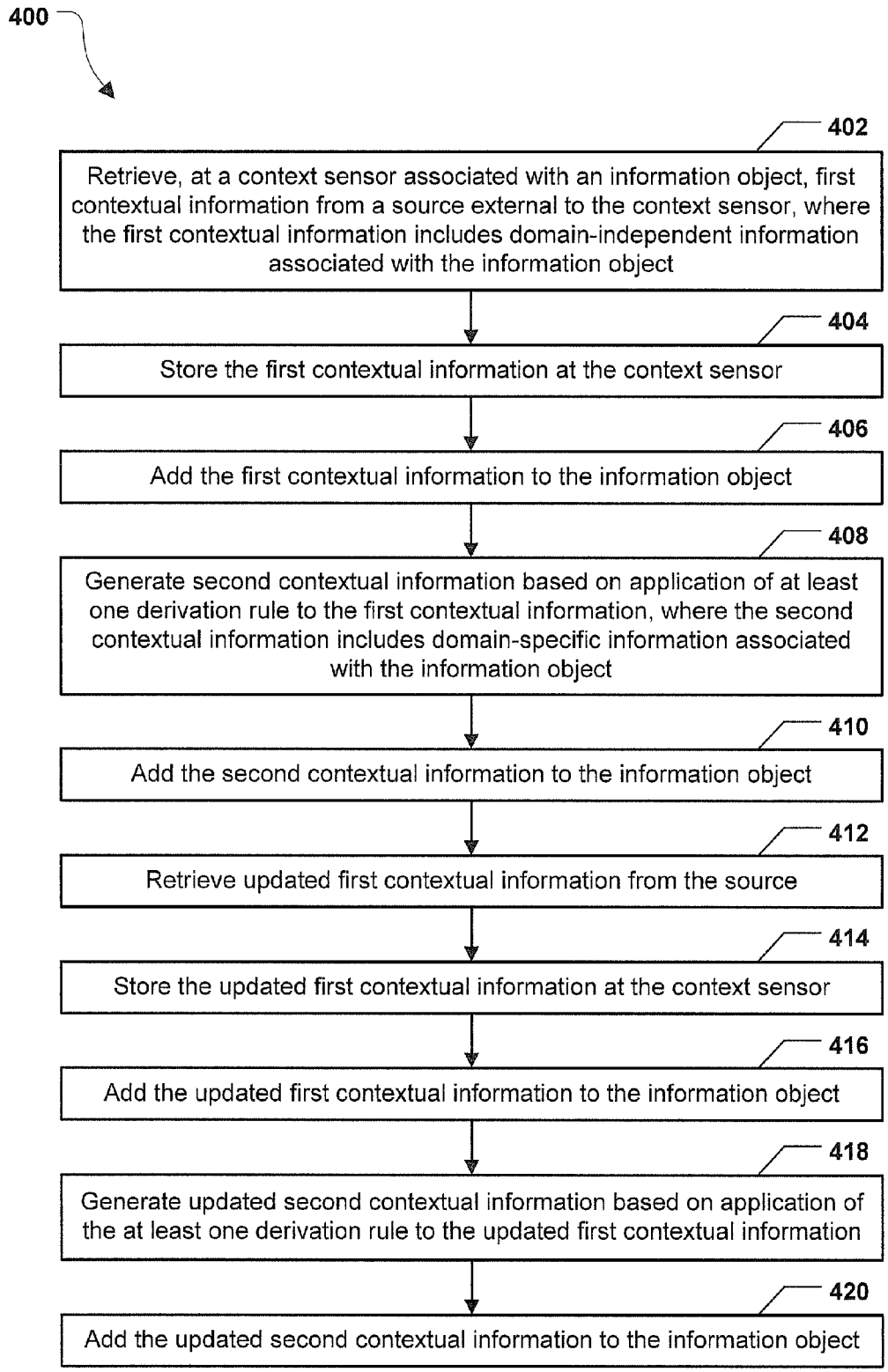
FIG. 4 is a flowchart to illustrate a particular embodiment of a method of updating contextual information.

Referring to FIG. 4, a flowchart of a particular embodiment of a method 400 of updating contextual information is illustrated. In an illustrative embodiment, the method 400 may be performed at the system 100 of FIG. 1.

The method 400 may include retrieving, at a context sensor associated with an information object, first contextual information from a source external to the context sensor, where the first contextual information includes domain-independent information associated with the information object, at 402. The method 400 may also include storing the first contextual information at the context sensor, at 404, and adding the first contextual information to the information object, at 406. For example, in FIG. 1, the primary contextual information 162 may be retrieved, stored at the second context sensor 160, and added to one or more of the information objects 170.

The method 400 may also include generating second contextual information based on application of at least one derivation rule to the first contextual information, at 408, and adding the second contextual information to the information object, at 410. The second contextual information may include domain-specific information associated with the information object. For example, in FIG. 1, secondary contextual information may be generated based on application of the derivation rule(s) 164 to the primary contextual information 162, and the secondary contextual information may be added to one or more of the information objects 170.

The method 400 may include retrieving updated first contextual information from the source, at 412, storing the updated first contextual information at the context sensor, at 414, and adding the updated first contextual information to the information object, at 416. For example, in FIG. 1, the primary contextual information 162 may be a temperature retrieved from the weather website 104. The context sensor 160 may instruct the context engine 110 to periodically refresh (e.g., "pull") the temperature (e.g., every 15 minutes). Alternately, the context sensor 160 may instruct the context engine 110 to register for temperature updates provided (e.g., "pushed") by the weather website 104. When an updated temperature is available, the updated temperature may be stored at the context sensor 160 and may be provided to one or more of the information objects 170.

The method 400 may also include generating updated second contextual information based on application of the at least one derivation rule to the updated first contextual information, at 418, and adding the updated second contextual information to the information object, at 420. For example, in FIG. 1, updated secondary contextual information may be derived based on the updated temperature from the weather website 104, and the updated secondary contextual information may be provided to one or more of the information objects 170

Figure 5:
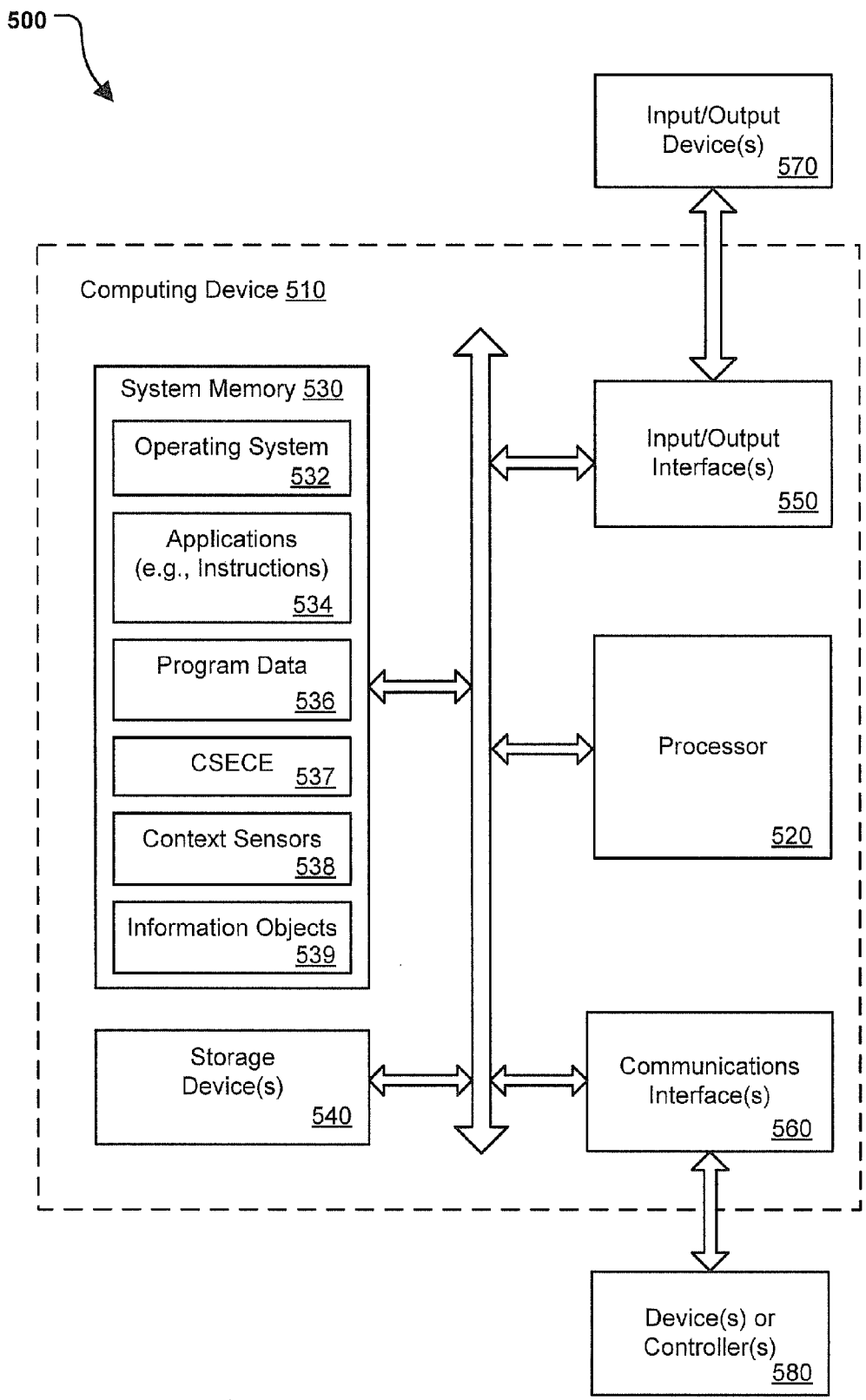
FIG. 5 is a block diagram of a computing environment including a computing device operable to support the contextual information processing techniques described herein.

FIG. 5 is a block diagram of a computing environment 500 including a computing device 510 operable to support the contextual information processing techniques described herein. The computing device 510 may include at least one processor 520. Within the computing device 510, the at least one processor 520 may communicate with a system memory 530, one or more storage devices 540, one or more input/output interfaces 550, one or more communications interfaces 560, or a combination thereof.

The system memory 530 may include volatile memory devices (e.g., random access memory (RAM) devices), nonvolatile memory devices (e.g., read-only memory (ROM) devices, programmable read-only memory, and flash memory), or both. The system memory 530 may include an operating system 532, which may include a basic input/output system for booting the computing device 510 as well as a full operating system to enable the computing device 510 to interact with users, other programs, and other devices. The system memory 530 may also include one or more applications 534 (e.g., represented by executable instructions) and program data 536. The program data 536 may include data used by the applications 534 to perform respective functions of the applications 534. The system memory 530 may further include a context engine 537 (e.g., the context engine 110 of FIG. 1), context sensors 538 (e.g., the context sensors 150, 160 of FIG. 1), information objects 539 (e.g., the information objects 170 of FIG. 1), or any combination thereof. In a particular embodiment, the context engine 537, the context sensors 538, and/or the information objects 539 may be located in one or more different computing devices (e.g., in a distributed computing environment).

The at least one processor 520 may also communicate with one or more storage devices 540. For example, the one or more storage devices 540 may include nonvolatile storage devices, such as magnetic disks, optical disks, or flash memory devices. The storage devices 540 may include both removable and non-removable memory devices. The storage devices 540 may be configured to store an operating system, applications, and program data. In a particular embodiment, the system memory 530, the storage devices 540, or both, include tangible, non-transitory computer-readable or processor-readable media. The storage devices 540 may store data used by one or more of the applications 534. The storage device 540 may also store at least a portion of the context engine 537, the context sensors 538, and/or the information objects 539.

In a particular embodiment, the processor 520 is configured to execute instructions, stored at a non-transitory computer-readable or processor-readable medium, such as the memory 530. The instructions are executable to cause a computer, such as the processor 520, to perform one or more methods or functions described herein.

The at least one processor 520 may also communicate with one or more input/output interfaces 550. The one or more input/output interfaces 550 may enable the computing device 510 to communicate with one or more input/output devices 570 to facilitate user interaction. For example, the one or more input/output interfaces 550 may be adapted to receive input from the user, to receive input from another computing device, or a combination thereof. The input/output interfaces 550 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 570 may include user interface devices and displays, including some combination of buttons, keyboards, pointing devices, displays, speakers, microphones, touch screens, and other devices.

The at least one processor 520 may communicate with other computer systems and/or other devices 580 via the one or more communications interfaces 560. The one or more communications interfaces 560 may include wired Ethernet interfaces, Institute of Electrical and Electronics Engineers (IEEE) 802.x wireless interfaces, Bluetooth communication interfaces, electrical, optical or radio frequency interfaces, or other wired or wireless interfaces. The other computer systems and/or devices 580 may include host computers, servers, workstations, portable computers, telephones, tablet computers, or any other communication device or component. For example, the other computer systems and/or devices 580 may include the external information sources/systems 102, 104, and 106 of FIG. 1.

Examples described herein illustrate but do not limit the disclosure. It should also be understood that numerous modifications and variations are possible in accordance with the principles of the present disclosure. Accordingly, the scope of the disclosure is defined only by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, the claimed subject matter may be directed to less than all of the features of any of the disclosed examples and embodiments.

What is claimed is:

1. A system comprising:
a processor; and
a memory coupled to the processor, the memory storing instructions executable by the processor to:
retrieve, at a first context sensor associated with a first information object, first contextual information from a source distinct from the first context sensor, wherein the first contextual information comprises domain-independent information associated with the first information object, and wherein the first information object corresponds to a first mission plan;
generate second contextual information based on application of a first derivation rule to the first contextual information, wherein the second contextual information comprises first domain-specific information associated with the first information object, and wherein the second contextual information indicates a change to the first mission plan;
add the second contextual information to the first information object;
transmit the second contextual information from the first context sensor to a second context sensor associated with a second information object, wherein the first context sensor is distinct from the second context sensor, and wherein the first information object is distinct from the second information object, and wherein the second information object corresponds to a second mission plan;
generate third contextual information based on application of a second derivation rule to the second contextual information, wherein the third contextual information comprises second domain-specific information associated with the second information object, and wherein the third contextual information indicates a constraint on the second mission plan caused by the change to the first mission plan;
transmit the third contextual information from the second context sensor to the first context sensor; and
generate fourth contextual information based on application of a third derivation rule to the third contextual information, wherein the fourth contextual information comprises third domain-specific information associated with the first information object.

2. The system of claim 1, wherein the second contextual information added to the first information object dynamically links the second contextual information to the first information object in real-time.

3. The system of claim 1, wherein the first context sensor is associated with a first logical context category, and wherein the second context sensor is associated with a second logical context category distinct from the first logical context category.

4. The system of claim 1, wherein the source is a third context sensor associated with the first information object.

5. The system of claim 4, wherein the first contextual information includes a proposed change to the first information object.

6. The system of claim 1, wherein the instructions are further executable by the processor to convert formatted data from the source to the first contextual information at a context adapter.

7. The system of claim 6, wherein the context adapter converts the formatted data based on a source syntax definition, a semantic mapping definition, a categorization rule, or a combination thereof.

8. The system of claim 1, wherein the first contextual information includes weather information for a first location associated with the first information object.

9. The system of claim 1, wherein the first mission plan corresponds to a combat plan.

10. The system of claim 9, wherein the second mission plan corresponds to a logistics plan, and wherein the constraint indicates a location where supplies are needed due to the change of the first mission plan.

11. The system of claim 1, wherein the fourth contextual information indicates that the second mission plan cannot be changed to accommodate the constraint on the second mission plan.

12. The system of claim 1, wherein the instructions are further executable by the processor to retrieve updated first contextual information in response to a request to update the first contextual information or a notification that the updated first contextual information is available.

13. The system of claim 1, wherein contextual information is domain-independent when the contextual information is obtained from an external information source, and wherein the contextual information is domain-specific when the contextual information is derived from domain independent contextual information based on a particular derivation rule associated with a particular information object.

14. The system of claim 1, wherein the first contextual information includes an action, an assumption, or a combination thereof.

15. The system of claim 1, wherein the instructions are further executable by the processor to add the third contextual information to the second information object.

16. The system of claim 1, further comprising a context engine configured to retrieve the first contextual information, wherein the context engine is distinct from the first context sensor.

17. A method comprising:
retrieving, at a first context sensor associated with a first information object, first contextual information from a source distinct from the first context sensor, wherein the first contextual information comprises domain-independent information associated with the first information object, and wherein the first information object corresponds to a first mission plan;
generating second contextual information based on application of a first derivation rule to the first contextual information, wherein the second contextual information comprises first domain-specific information associated with the first information object, and wherein the second contextual information indicates a change to the first mission plan;
adding, by the first context sensor, the second contextual information to the first information object;
transmitting the second contextual information from the first context sensor to a second context sensor associated with a second information object, wherein the first context sensor is distinct from the second context sensor, and wherein the first information object is distinct from the second information object, and wherein the second information object corresponds to a second mission plan;
generating third contextual information based on application of a second derivation rule to the second contextual information, wherein the third contextual information comprises second domain-specific information associated with the second information object, and wherein the third contextual information indicates a constraint on the second mission plan caused by the change to the first mission plan;
transmit the third contextual information from the second context sensor to the first context sensor; and
generate fourth contextual information based on application of a third derivation rule to the third contextual information, wherein the fourth contextual information comprises third domain-specific information associated with the first information object.

18. The method of claim 17, further comprising:
detecting that the first contextual information has been updated to updated first contextual information;
retrieving the updated first contextual information;
generating updated second contextual information based on application of the first derivation rule to the updated first contextual information; and
adding the updated second contextual information to the first information object.

19. A non-transitory processor-readable medium comprising instructions that, when executed by a processor, cause the processor to:
retrieve, at a first context sensor associated with a first information object, first contextual information from a source distinct from the first context sensor, wherein the first contextual information comprises domain-independent information associated with the first information object, and wherein the first information object corresponds to a first mission plan;
generate second contextual information based on application of a first derivation rule to the first contextual information, wherein the second contextual information comprises first domain-specific information associated with the first information object, and wherein the second contextual information indicates a change to the first mission plan;
add the second contextual information to the first information object;
transmit the second contextual information from the first context sensor to a second context sensor associated with a second information object, wherein the first context sensor is distinct from the second context sensor, and wherein the first information object is distinct from the second information object, and wherein the second information object corresponds to a second mission plan;
generate third contextual information based on application of a second derivation rule to the second contextual information, wherein the third contextual information comprises second domain-specific information associated with the second information object, and wherein the third contextual information indicates a constraint on the second mission plan caused by the change to the first mission plan;
transmit the third contextual information from the second context sensor to the first context sensor; and
generate fourth contextual information based on application of a third derivation rule to the third contextual information, wherein the fourth contextual information comprises third domain-specific information associated with the first information object.

20. The non-transitory processor-readable medium of claim 19, further comprising instructions that, when executed by the processor, cause the processor to:

detect that the first contextual information has been updated to updated first contextual information;
retrieve the updated first contextual information;
generate updated second contextual information based on application of the first derivation rule to the updated first contextual information; and
add the updated second contextual information to the first information object.

\* \* \* \* \*